(12) United States Patent
Inoue et al.

(10) Patent No.: US 6,995,951 B2
(45) Date of Patent: Feb. 7, 2006

(54) METHOD OF PLANARIZING SUBSTRATE, MAGNETIC HEAD AND MANUFACTURING METHOD OF THE SAME

(75) Inventors: Yoshihiko Inoue, Miyagi (JP); Seiichi Ogata, Miyagi (JP)

(73) Assignee: Sony Corporation, Tokyo (JP)

( * ) Notice: Subject to any disclaimer, the term of this patent is extended or adjusted under 35 U.S.C. 154(b) by 440 days.

(21) Appl. No.: 10/107,224

(22) Filed: Mar. 27, 2002

(65) Prior Publication Data
US 2002/0187565 A1   Dec. 12, 2002

(30) Foreign Application Priority Data
Apr. 3, 2001  (JP)  ............................ 2001-105007

(51) Int. Cl.
*G11B 5/147*   (2006.01)
(52) U.S. Cl. ..................................... 360/126
(58) Field of Classification Search ............ 360/264.7, 360/126, 125, 123, 322
See application file for complete search history.

(56) References Cited

U.S. PATENT DOCUMENTS

| | | | | |
|---|---|---|---|---|
| 4,559,572 A | * | 12/1985 | Kumasaka et al. | 360/110 |
| 4,656,547 A | * | 4/1987 | Kumasaka et al. | 360/126 |
| 5,034,285 A | * | 7/1991 | Satomi et al. | 428/692 |
| 5,883,766 A | * | 3/1999 | Ogata et al. | 360/126 |
| 6,426,848 B1 | * | 7/2002 | Tamura et al. | 360/126 |
| 2002/0039263 A1 | * | 4/2002 | Inaguma | 360/322 |

* cited by examiner

*Primary Examiner*—Allen Cao
(74) *Attorney, Agent, or Firm*—Sonnenschein, Nath & Rosenthal LLP

(57) ABSTRACT

In order to have a remarkably planarized substrate easily, a glass thin film is predeposited on a surface of a non-magnetic substrate. The non-magnetic substrate is subjected to heat treatment until the glass thin film is softened to a predetermined viscosity, and then the non-magnetic substrate is cured until the glass thin film is hardened.

6 Claims, 14 Drawing Sheets

F I G. 2
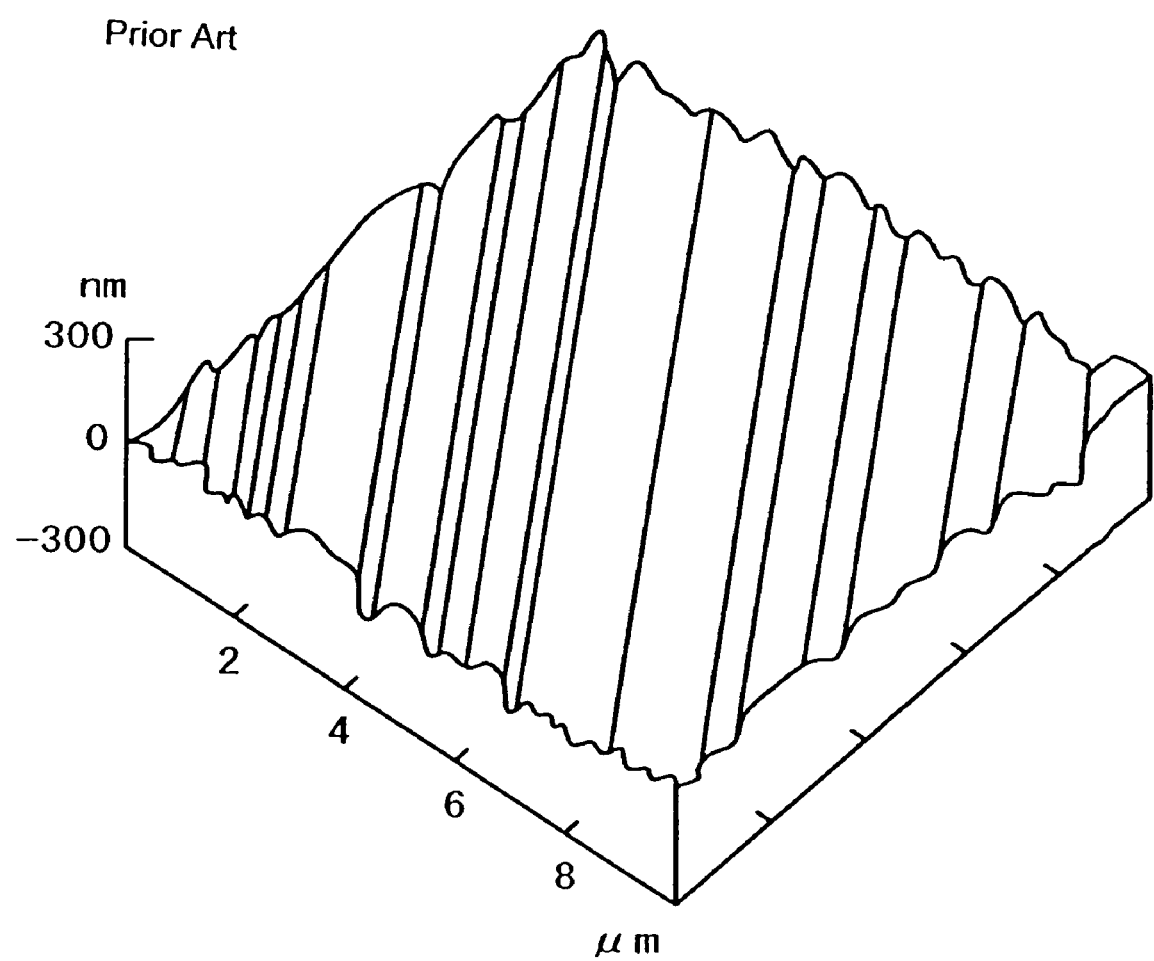

METHOD OF PLANARIZING SUBSTRATE, MAGNETIC HEAD AND MANUFACTURING METHOD OF THE SAME

CROSS REFERENCES TO RELATED APPLICATIONS

The present document is based on Japanese Priority Document JP 2001-105007, filed in the Japanese Patent Office on Apr. 3, 2001, the entire contents of which being incorporated herein by reference.

BACKGROUND OF THE INVENTION

1. Field of the Invention

The present invention relates to a method of planarizing a substrate suitable for remarkably planarizing a surface thereof, and to a magnetic head produced by using such a planarized substrate and a method of manufacturing the magnetic head.

2. Description of the Related Art

In recent years, devices formed on a substrate with thin film technology have been prevalent as various types of electronics are highly integrated and become smaller in size. For such devices using the thin film technology, it is important to mirror-finish a surface of a substrate, that is, to remarkably planarize the surface, in order to achieve improved characteristics and a higher integration.

An example of the devices formed on a substrate using the thin film technology is a so-called bulk thin film type magnetic head, which has a pair of magnetic core halves, each half including a non-magnetic substrate and a metal magnetic thin film obliquely deposited on the non-magnetic substrate. The paired halves are bonded integrally to each other with the one metal magnetic thin film abutting on the other such that a magnetic gap is formed between abutting surfaces. In addition, surfaces of the non-magnetic substrates on which the metal magnetic thin films are deposited are not in parallel with the magnetic gap.

In the bulk thin film type magnetic head, impedance can be reduced by setting a short magnetic path for the magnetic core formed of the metal magnetic thin films deposited on the non-magnetic substrates.

When the aforementioned bulk thin film type magnetic head is produced, the metal magnetic thin film is deposited on the surface of the non-magnetic substrate in which a plurality of grooves having slopes are formed at a predetermined interval to obtain the metal magnetic thin film not in parallel with the magnetic gap. Conventionally, the surface of the non-magnetic substrate on which the metal magnetic thin film is deposited has been mirror-finished through lapping using abrasive grains.

In producing the bulk thin film type magnetic head, however, the aforementioned lapping has difficulties in mirror-finishing inner surfaces of the grooves formed on the surface on which the metal magnetic thin film is deposited. Specifically, since the lapping relies on polishing works using abrasive grains to mirror-finish the surface of the non-magnetic substrate on which the metal magnetic thin film is deposited, it is difficult to remarkably planarize the inner surfaces of the grooves formed in the surface of the non-magnetic substrate, that is, slopes, sides, bottoms or the like inside the grooves. The lapping also takes excessive time to mirror-finish the inner surfaces of the grooves formed in the surface of the non-magnetic substrate. In addition, the lapping may involve a significantly complicated process for enhancing accuracy in forming the grooves formed on the surface of the non-magnetic substrate and mirror-finishing the inner surfaces of the grooves. Furthermore, in the lapping, it is difficult to mirror-finish the inner surfaces of the grooves formed in the surface depending on the materials of the non-magnetic substrate.

SUMMARY OF THE INVENTION

To address the problems, it is an aspect of the present invention to provide a method of planarizing a substrate capable of remarkably planarizing a surface of a substrate, a magnetic head capable of providing significantly improved head characteristics by using such a substrate, and a method of manufacturing the magnetic head.

The method of planarizing a substrate according to the present invention comprises the steps of:

predepositing a glass thin film on a surface of a substrate; performing heat treatment on the substrate until the glass thin film is softened to a predetermined viscosity; and then curing the substrate until the glass thin film is hardened.

In the method of planarizing a substrate according to the present invention, since the substrate is subjected to the heat treatment until the glass thin film is softened to the predetermined viscosity and then the substrate is cured until the glass thin film is hardened, thermal shrinkage at the hardening of the softened glass thin film stretches the surface of the glass thin film to remarkably planarize the surface of the substrate.

A magnetic head according to the present invention comprises a pair of magnetic core halves, each of the halves having a non-magnetic substrate and a metal magnetic thin film deposited over a surface of the non-magnetic substrate. The pair of halves are bonded integrally to each other with the one metal magnetic thin film abutting on the other and with a magnetic gap formed between the abutting surfaces. The respective surfaces of the non-magnetic substrates over which the metal magnetic thin films are deposited are in nonparallel with the magnetic gap. Each non-magnetic substrate has a glass thin film deposited on the surface thereof over which each metal magnetic film is deposited.

In the magnetic head according to the present invention, the glass thin film deposited on the surface of the non-magnetic substrate over which the metal magnetic thin film is deposited causes the surface of the non-magnetic substrate to be remarkably planarized. Thus, favorable soft magnetic properties are achieved in the metal magnetic thin film deposited over the non-magnetic substrate having the remarkably planarized surface to improve the characteristics of the magnetic head.

A method of manufacturing a magnetic head according to the present invention comprises the steps of: predepositing a glass thin film on a surface of a nonmagnetic substrate having a plurality of grooves formed therein at predetermined intervals, performing heat treatment on the nonmagnetic substrate until the glass thin film is softened to a predetermined viscosity, then curing the nonmagnetic substrate until the glass thin film is hardened so as to planarize the surface of the non-magnetic substrate; depositing a metal magnetic thin film on the non-magnetic substrate; forming a glass layer to cover the non-magnetic substrate on which the metal magnetic thin film is deposited, and depositing a thin film coil in a recess formed on a surface of the glass layer subjected to planarizing to produce a pair of magnetic core half blocks; placing face-to-face and bonding the pair of magnetic core half blocks such that end faces of the respective metal magnetic thin films confront each other through a non-magnetic thin film to produce a magnetic core block; and cutting the magnetic core block into individual magnetic heads.

In the method of manufacturing a magnetic head according to the present invention, since thermal shrinkage at the hardening of the softened glass thin film stretches the surface of the glass thin film to remarkably planarize the surface of the non-magnetic substrate including the inner surfaces of the grooves formed in the surface of the non-magnetic substrate, favorable soft magnetic properties are obtained in the metal magnetic thin film deposited over the non-magnetic substrate having the remarkably planarized surface. Then, the pair of the magnetic core half blocks are formed and the end faces of the metal magnetic thin films of the paired magnetic core half blocks are bonded to each other through the non-magnetic thin film to produce the magnetic core block which is then cut into individual magnetic heads. It is thus possible to manufacture the magnetic heads in volume with improved characteristics.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 2 is a perspective view showing a main portion of a conventional non-magnetic substrate;

DESCRIPTION OF THE PREFERRED EMBODIMENT

A preferred embodiment of the present invention will hereinafter be described in detail with reference to the drawings.

Figure 1:
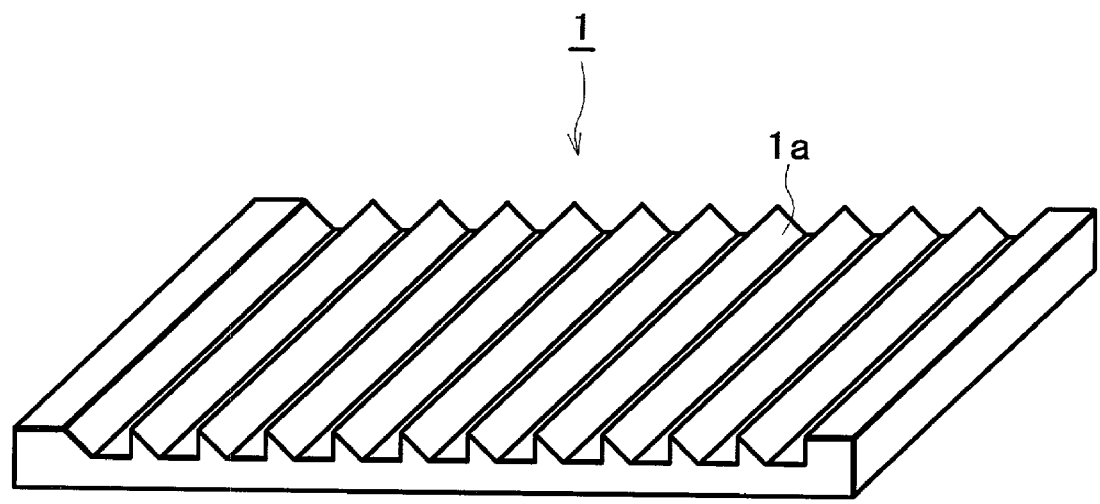
FIG. 1 is a schematic perspective view of a non-magnetic substrate according to the present invention.

A method of planarizing a substrate to which the present invention is applied will be described, by way of example, for a case where planarizing is performed on a surface of a non-magnetic substrate 1 having grooves formed thereon through grinding with a grindstone for use in a bulk thin film type magnetic head as shown in FIG. 1.

The non-magnetic substrate 1 is made of a $CaO-TiO_2-NiO$ based material or the like, for example. Lapping or the like has been performed on a surface of the substrate 1 including slopes $1a$ of the grooves, but the substrate 1 has a coarse surface with excessive asperities as shown in FIG. 2. The surface of the non-magnetic substrate 1 subjected to the lapping has a centerline average roughness (hereinafter referred to as "surface roughness Ra") of 43 nm, which was measured using an AFM (Atomic Force Microscope). Conventionally, it has been assumed that it would be difficult to achieve a surface roughness Ra of 30 nm or less of inner surfaces of grooves formed in a surface of a non-magnetic substrate through machining such as lapping. FIG. 2 shows the slopes $1a$ formed on the non-magnetic substrate 1 observed with the AFM.

Figure 3:
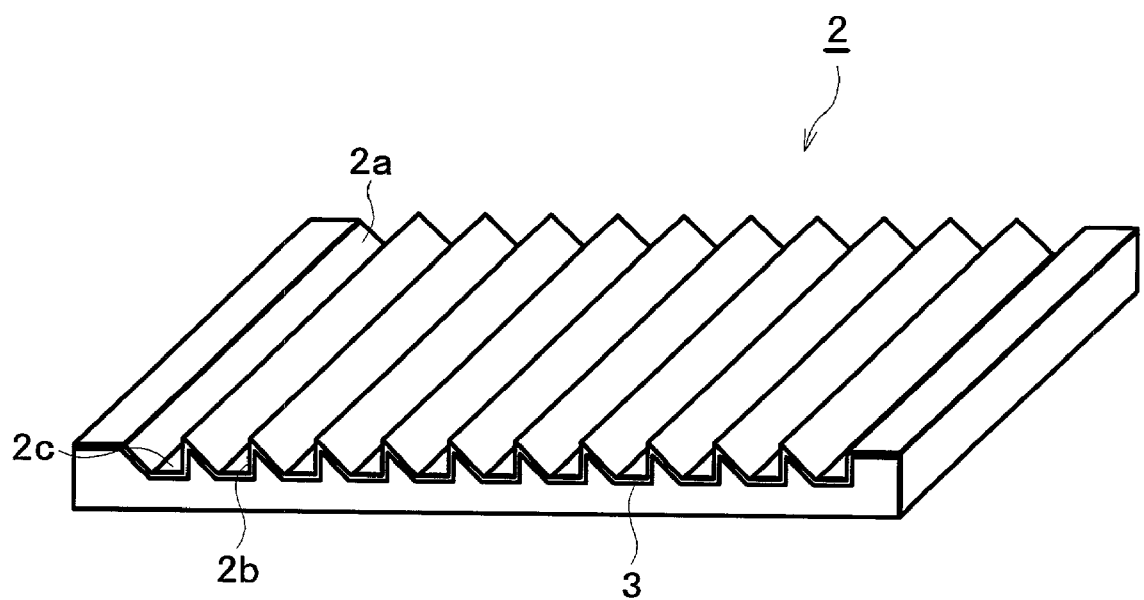
FIG. 3 is a schematic perspective view showing the non-magnetic substrate according to the present invention on which a glass thin film is deposited.

To address this challenge, in the method of planarizing a substrate to which the present invention is applied, as shown in FIG. 3, a non-magnetic substrate 2 is subjected to heat treatment until a glass thin film 3 predeposited on a main surface of the non-magnetic substrate 2 is softened to a predetermined viscosity, and then the non-magnetic substrate 2 is cured until the softened glass thin film 3 is hardened, thereby mirror-finishing or remarkably planarizing the surface of the non-magnetic substrate 2 including inner surfaces of grooves.

Specifically, in the method of planarizing a substrate, the glass thin film 3 is first predeposited on one main surface of the non-magnetic substrate 2, for example, through sputtering at a thickness of approximately 500 nm. Used as the glass thin film 3 is borosilicate glass (YSK-60329, manufactured by Senyo Glass Industry Co., Ltd.) having at approximately 700° C. a viscosity of $10^{6.76}$ Pa·s, which is generally considered as corresponding to a softening point. It should be noted that the glass thin film 3 is not limited to such borosilicate glass, and any other glass materials may be used, for example low-melting glass having a low softening point.

Figure 4:
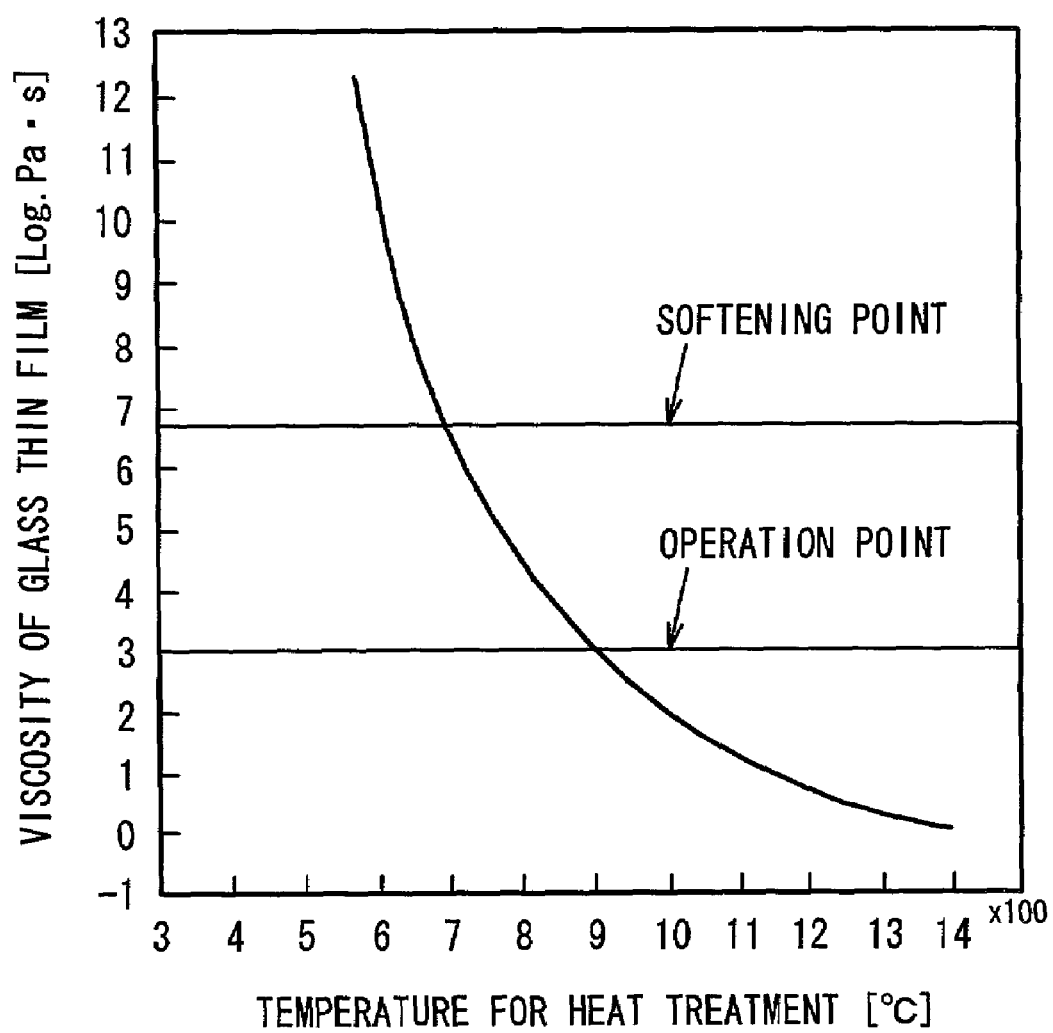
FIG. 4 is a graph showing the relationship between temperature and viscosity in the glass thin film.

FIG. 4 shows the relationship between temperature and the viscosity of the glass thin film 3 when the non-magnetic substrate 2 is subjected to heat treatment until the glass thin film 3 is softened.

As shown in FIG. 4, the glass thin film 3 reaches a viscosity of $10^{6.76}$ Pa·s generally considered as a softening point of glass at 700° C., and reaches a viscosity of $10^3$ Pa·s generally considered as an operation point of glass at 900° C.

In the method of planarizing a substrate to which the present invention is applied, the non-magnetic substrate 2 is subjected to heat treatment for softening the glass thin film 3 in a range from 700° C. or higher in which the glass has a viscosity of $10^{6.76}$ Pa·s (softening point) or lower to 900° C. or lower in which the glass has a viscosity of $10^3$ Pa·s (operation point) or higher. This will be later described.

After the non-magnetic substrate 2 is subjected to the heat treatment until the deposited glass thin film 3 is softened to the predetermined viscosity, the non-magnetic substrate 2 is cured, that is, aging is caused, until the softened glass thin film 3 is hardened.

Next, thermal shrinkage at the time of the hardening of the softened glass thin film 3 stretches the surface of the glass thin film 3 to planarize the surface of the non-magnetic substrate 2.

Figure 5:
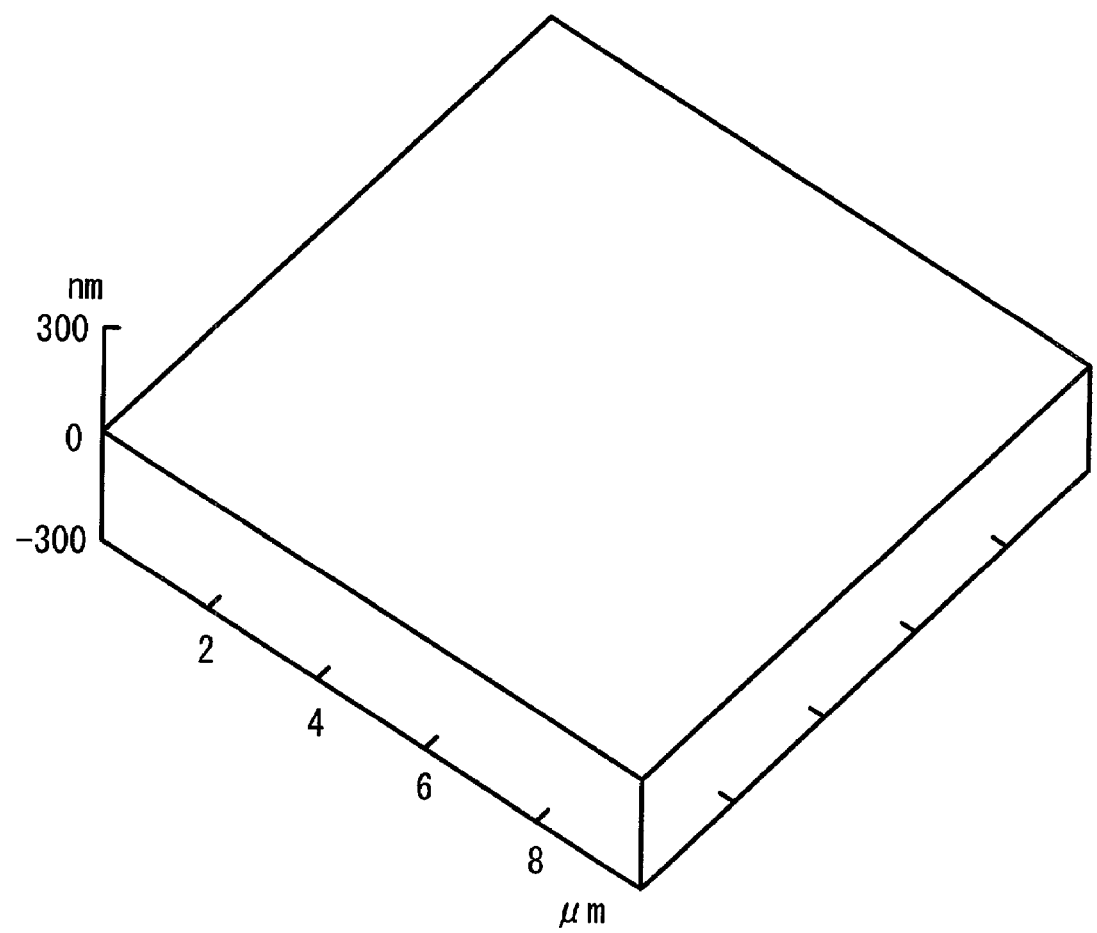
FIG. 5 is a perspective view showing a main portion of the non-magnetic substrate.

In this manner, in the method of planarizing a substrate to which the present invention is applied, the non-magnetic substrate 2 is subjected to the heat treatment until the glass thin film 3 is softened to the predetermined viscosity and then the non-magnetic substrate 2 is cured until the glass thin film 3 is hardened, and the thermal shrinkage at the time of the hardening of the softened glass thin film 3 stretches the surface of the glass thin film 3. Thus, as shown in FIG. 5, the surface of the non-magnetic substrate 2 can be remarkably planarized including slopes 2a, sides 2b, and bottoms 2c inside the grooves shown in FIG. 3. FIG. 5 shows the slopes 2a of the grooves formed in the surface of the non-magnetic substrate 2 observed with the AFM after the heat treatment and the curing.

An underlying film (not shown) made of chromium or chromium oxide may be deposited on the surface of the non-magnetic substrate 2 over which the glass thin film 3 is to be deposited. This underlying film can prevent the glass thin film 3 from reacting with the non-magnetic substrate 2 to form crystalline during the heat treatment for softening the glass thin film 3. In addition, while the non-magnetic substrate 2 may have poor wettability for the glass thin film 3 depending on its material properties to reject the softened glass thin film 3, the underlying film can be deposited to avoid the softened glass thin film 3 from being rejected.

Figure 6:
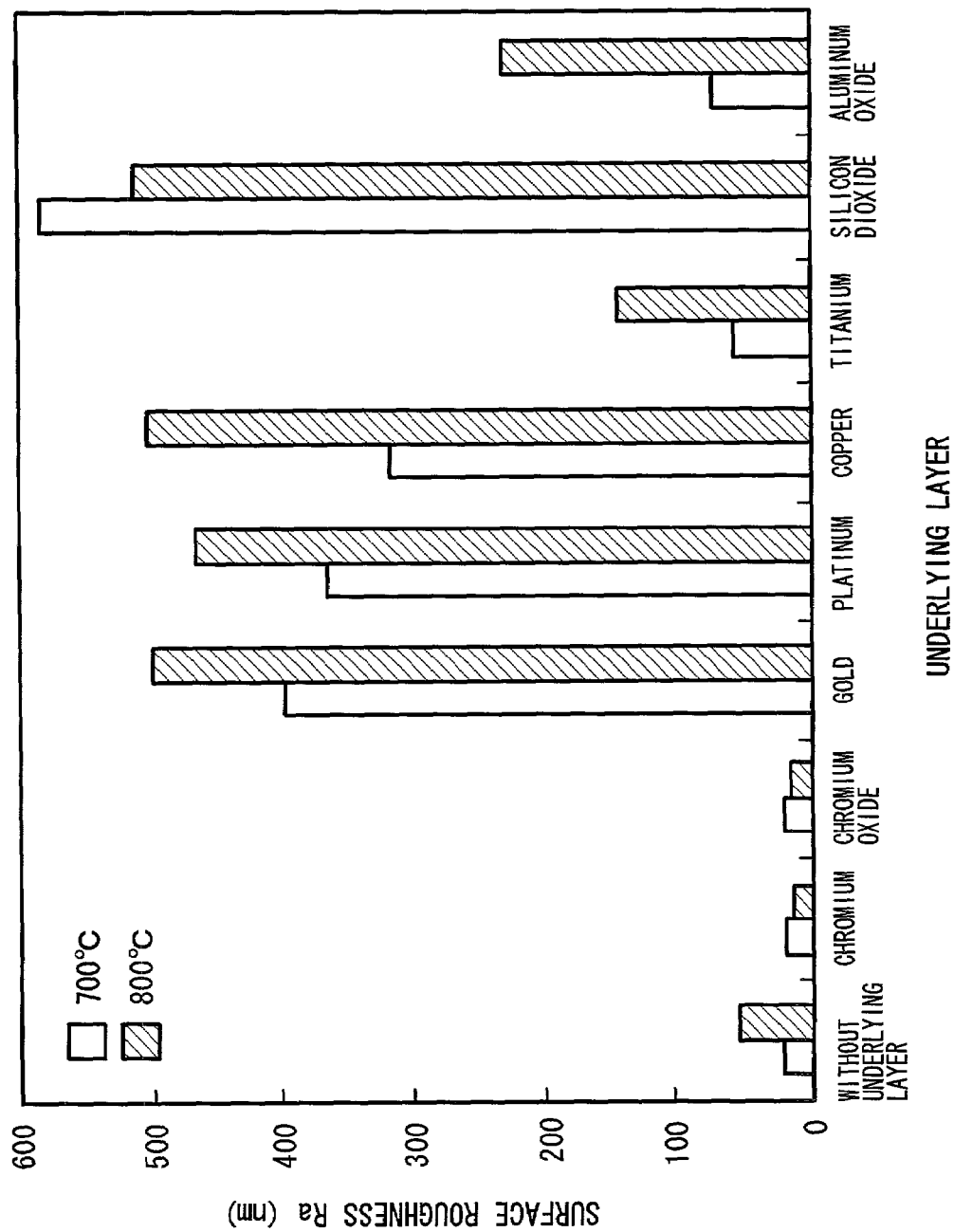
FIG. 6 is a graph showing the relationship between types of an underlying layer and surface roughness of the non-magnetic substrate.

Non-magnetic substrates 2 having underlying films deposited thereon made of chromium, chromium oxide, gold, platinum, copper, titanium, silicon dioxide, and an aluminum oxide, were subjected to heat treatment at 700° C. at which glass thin films 3 have a viscosity of $10^{6.76}$ Pa·s as shown in FIG. 4 for one minute and at 800° C. at which glass thin films 3 have a viscosity of $10^{4.4}$ Pa·s shown in FIG. 4 for one minute, and the surface roughness Ra of the non-magnetic substrates 2 after they were cured until the glass thin films 3 were hardened was respectively measured. FIG. 6 shows the measurement results of the surface roughness Ra of the non-magnetic substrates 2 having the different underlying films after the heat treatment at the respective temperatures and the curing. FIG. 6 is a graph showing the relationship between the types of the underlying films and the surface roughness Ra of the non-magnetic substrates 2 and also showing values of a non-magnetic substrate 2 with no underlying film deposited thereon as reference values.

It can be seen from the measurement results shown in FIG. 6 that the underlying film made of chromium or chromium oxide achieves remarkable planarizing with a surface roughness Ra of 20 nm or less.

On the other hand, the other underlying films made of gold, platinum, copper, titanium, silicon dioxide or an aluminum oxide each have a surface roughness Ra of at least 50 nm which means significantly coarse surfaces. This is because the underlying film made of gold, platinum or copper rejected the softened glass film 3 in heat treatment on the non-magnetic substrate 2 to degrade the surface roughness Ra of the non-magnetic substrate 2. For the underlying layer made of titanium, silicon dioxide or an aluminum oxide, the high surface roughness Ra occurred because the softened glass thin film 3 reacted with the underlying film in heat treatment on the non-magnetic substrate 2 to precipitate crystalline in the glass thin film 3, resulting in the degraded surface roughness Ra of the non-magnetic substrate 2.

Thus, in the method of planarizing a substrate to which the present invention is applied, it is clear that the use of the underlying film made of chromium or chromium oxide between the non-magnetic substrate 2 and the glass thin film 3 can suppress the degradation of the surface roughness Ra of the non-magnetic substrate 2, in other words, remarkably planarize the surface of the non-magnetic substrate 2.

Figure 7:
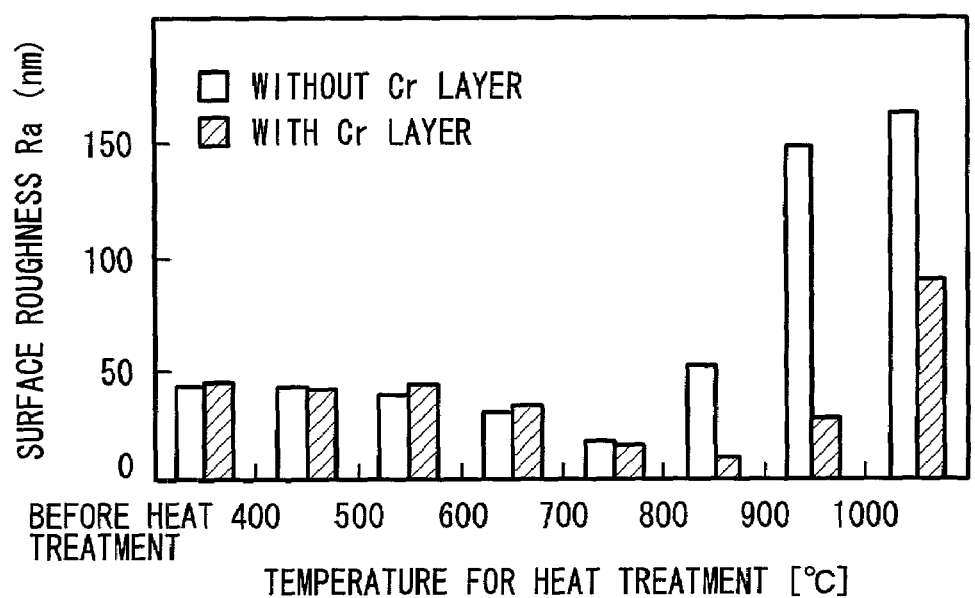
FIG. 7 is a graph showing the relationship between temperature for heat treatment and surface roughness in the non-magnetic substrate according to the present invention.

Next, heat treatment was performed on a non-magnetic substrate 2 with no underlying film deposited thereon and on a non-magnetic substrate 2 having an underlying film made of chromium deposited thereon at varying temperatures from 400 to 1000° C. or higher for one minute and the surface roughness Ra of each non-magnetic substrate 2 at each temperature was measured. FIG. 7 shows the measurement results of the surface roughness Ra of the non-magnetic substrates 2 at the respective heat treatment temperatures. FIG. 7 is a graph showing the relationship between the temperature for the heat treatment performed on the non-magnetic substrates 2 and the surface roughness Ra of the non-magnetic substrates 2, and also showing values of the respective non-magnetic substrates 2 on which no heat treatment was performed as reference values.

It can be seen from the measurement results in FIG. 7 that the non-magnetic substrate 2 with no underlying film had an improved surface roughness Ra to approximately 19 nm which means a remarkably planarized surface at a heat treatment temperature of 700° C. or higher, that is, at a viscosity of $10^{6.76}$ Pa·s or lower of the glass thin film shown in FIG. 4, and at a heat treatment temperature of 800° C. or lower, that is, a viscosity of $10^{4.4}$ Pa·s or higher of the glass thin film shown in FIG. 4.

On the other hand, it can be seen that the non-magnetic substrate 2 with no underlying film did not have such a remarkably planarized surface as to achieve a surface roughness Ra of 30 nm or lower at a heat treatment temperature of less than 700° C., that is, at a viscosity of more than $10^{6.76}$ Pa·s of the glass thin film 3 shown in FIG. 4, and showed a suddenly increased surface roughness Ra which means a deteriorated surface state as the heat treatment temperature was 800° C. or higher, that is, as the viscosity was $10^{4.4}$ Pa·s or lower in the glass thin film 3 shown in FIG. 4.

It is contemplated that this is because that the glass thin film 3 shown in FIG. 4 at a viscosity of more than $10^{6.76}$ Pa·s showed less thermal shrinkage, which did not stretch appropriately the surface of the glass thin film 3 during the softening and the subsequent hardening of the glass thin film 3, so that it was difficult to planarize the surface of the non-magnetic substrate 2. On the other hand, it is also contemplated that the glass thin film 3 shown in FIG. 4 at a viscosity of less than $10^{4.4}$ Pa·s reacted with the non-magnetic substrate 2 when the glass 3 was softened and thus crystalline is precipitated into the glass thin film 3, so that it was difficult to planarize the surface of the non-magnetic substrate 2.

Therefore, it is apparent that in the method of planarizing a substrate to which the present invention is applied, when no underlying film is deposited on the non-magnetic substrate 2, the glass thin film 3 deposited on the non-magnetic substrate 2 is softened at a viscosity in a range from $10^{4.4}$ Pa·s to $10^{6.76}$ Pa·s, that is, the glass thin film 3 deposited on the non-magnetic substrate 2 is softened at a heat treatment temperature from 700 through 800° C., thereby making it possible to remarkably planarize the surface.

On the other hand, when the underlying film made of chromium was deposited on the non-magnetic substrate 2, the surface roughness Ra was improved to approximately 11 nm and the surface was remarkably planarized at a heat treatment temperature of 700° C. or higher, that is, at a viscosity of $10^{6.76}$ Pa·s or lower of the glass thin film shown in FIG. 4, and at a heat treatment temperature of 900° C. or lower, that is, at a viscosity of $10^3$ Pa·s or higher of the glass thin film shown in FIG. 4.

On the other hand, the non-magnetic substrate 2 with the underlying film made of chromium deposited thereon did not show such a remarkably planarized surface as to achieve a surface roughness Ra of 30 nm or lower at a heat treatment temperature of less than 700° C., that is, at a viscosity of $10^{6.76}$ Pa·s or higher of the glass thin film 3 shown in FIG. 4, and the surface roughness Ra is increased and the surface state is deteriorated at a heat treatment temperature of more than 900° C., that is, at a viscosity of $10^3$ Pa·s or lower of the glass thin film 3 shown in FIG. 4.

It is contemplated that this is because the glass thin film 3 shown in FIG. 4 at a viscosity of more than $10^{6.76}$ Pa·s showed less thermal shrinkage which did not appropriately stretch the surface of the glass thin film 3 during the softening and the subsequent hardening of the glass thin film 3, so that it was difficult to planarize the surface of the non-magnetic substrate 2. On the other hand, the glass thin film 3 shown in FIG. 4 at a viscosity of less than $10^3$ Pa·s reacted with the non-magnetic substrate 2 when the glass thin film 3 was softened due to degradation of the underlying film resulting from the excessively high temperature in the heat treatment to precipitate crystalline into the glass thin film 3, so that it was difficult to planarize the surface of the non-magnetic substrate 2.

Thus, in the method of planarizing a substrate to which the present invention is applied, it is clear that the surface of the non-magnetic substrate 2 with the underlying film made of chromium deposited thereon can be remarkably planarized by softening the glass thin film 3 formed over the non-magnetic substrate 2 at a viscosity in a range from $10^3$ Pa·s through $10^{6.76}$ Pa·s, that is, by performing the heat treatment for softening the glass thin film 3 deposited over the non-magnetic substrate 2 at a temperature from 700 through 900° C. While the chromium was used for the underlying film in the above measurement, it goes without saying that similar results are obtained when chromium oxide is used for the underlying film.

Figure 8:
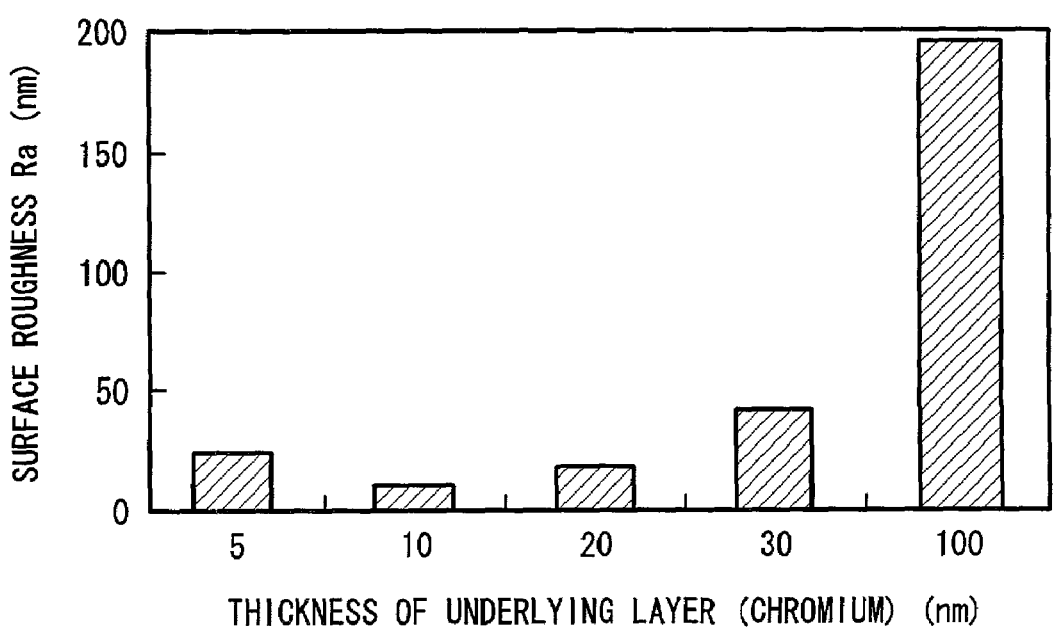
FIG. 8 is a graph showing the relationship between thickness of the underlying layer and surface roughness of the non-magnetic substrate.

Next, heat treatment was performed on non-magnetic substrates 2 having underlying films made of chromium of varying thicknesses from 5 to 100 nm at a temperature of 800° C. at which the glass shown in FIG. 4 has a viscosity of approximately $10^{4.4}$ Pa·s for one minute and the surface roughness Ra of the non-magnetic substrates 2 after curing was measured. FIG. 8 shows the measurement results of the surface roughness Ra of the non-magnetic substrates 2 having the underlying films of varying thicknesses after the heat treatment and the subsequent curing. FIG. 8 is a graph showing the relationship between the thickness of the underlying layers made of chromium and the surface roughness Ra of the non-magnetic substrates 2.

It can be seen from the measurement results in FIG. 8 that the underlying film made of chromium at a thickness of 10 nm achieves the minimum surface roughness Ra of the non-magnetic substrate 2, and as the thickness of the underlying film is more than 20 nm, the surface roughness Ra of the non-magnetic substrate 2 is increased gradually.

Consequently, if the underlying film made of chromium on the non-magnetic substrate 2 has a thickness of more than 20 nm, an excessive amount of the chromium is mixed into the glass thin film 3 in performing heat treatment for softening the glass thin film 3 to separate the glass thin film 3 from the surface on which the glass thin film 3 is deposited, thereby making it difficult to suppress the surface roughness Ra.

Therefore, in the method of planarizing a substrate to which the present invention is applied, it is preferable to deposit the underlying film made of chromium at a thickness of 20 nm or smaller on the surface of the non-magnetic substrate 2 over which the glass thin film 3 is deposited. In the method of planarizing a substrate to which the present invention is applied, the material of the underlying film deposited at an appropriate thickness is not excessively mixed into the glass thin film 3 to separate the glass thin film 3, and thermal shrinkage at the hardening of the softened glass thin film 3 stretches the surface of the glass thin film 3 to remarkably planarize the surface of the non-magnetic substrate 2. In this manner, the surface of the non-magnetic substrate 2 can be mirror-finished including the inner surfaces of the grooves formed in the surface of the non-magnetic substrate 2. While the chromium was used for the underlying film in the above measurement, it goes without saying that similar results are obtained when chromium oxide is used for the underlying film.

Next, description will be made for a magnetic head produced by using the aforementioned substrate planarizing method to which the present invention is applied.

Figure 9:
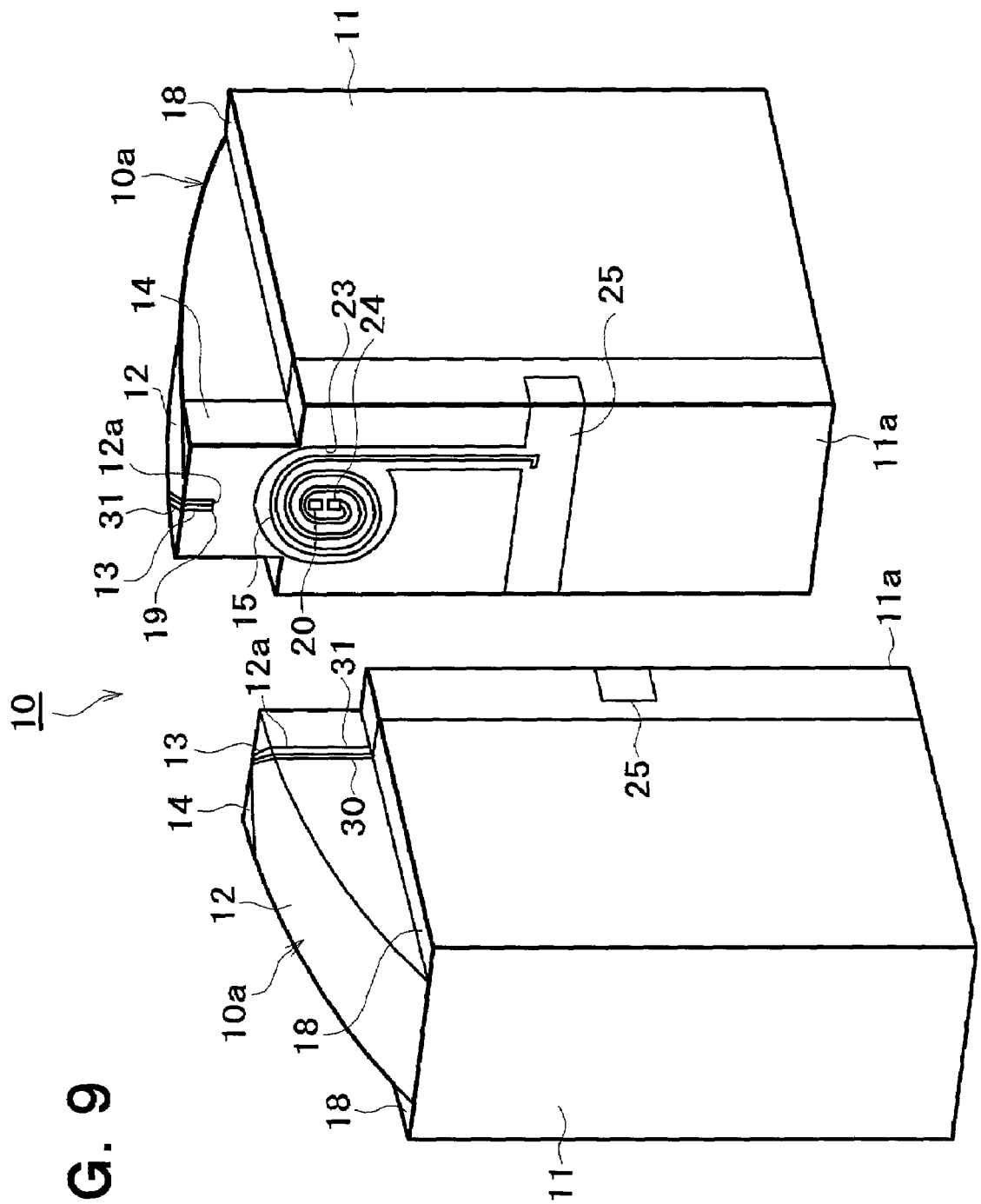
FIG. 9 is an exploded perspective view showing a magnetic head.

A magnetic head 10 shown in FIG. 9 is composed of a pair of magnetic core halves 11 bonded to each other through metal diffusion bonding. Each of the paired magnetic core halves 11 is formed of a non-magnetic substrate 12 made of a CaO—TiO$_2$—NiO based non-magnetic material, a metal magnetic thin film 13 deposited on a main surface of the non-magnetic substrate 12 on which a slope 12a is formed, and a low-melting glass 14 covering the metal magnetic thin film 13. On at least one of the paired magnetic core halves 11, a thin film coil 15 is deposited for excitation and/or detection of induced electromotive force.

Figure 10:
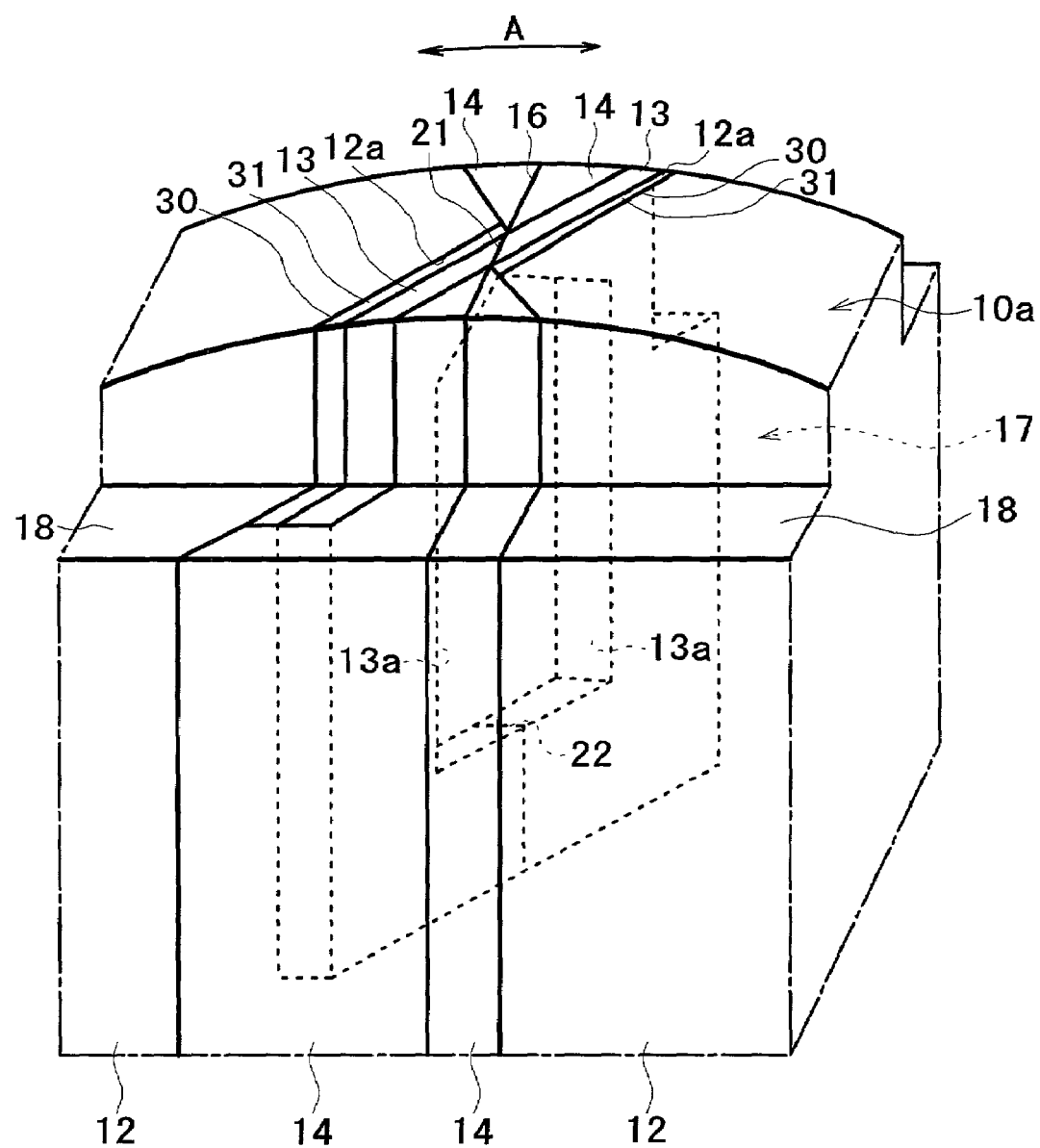
FIG. 10 is an enlarged perspective view showing a main portion of a magnetic core of the magnetic head and its surroundings.

As shown in FIG. 10, in the magnetic head 10, the metal magnetic thin films 13 form a magnetic core 17 with the pair of magnetic core halves 11 bonded to each other through a non-magnetic thin film 16. In FIG. 10, the thin film coil 15 is omitted.

As a magnetic recording medium (not shown) is slid in a direction shown by an arrow A in FIG. 10, the magnetic head 10 reproduces a signal with a magnetic field recorded on the magnetic recording medium or records a signal with a magnetic field onto the magnetic recording medium.

The magnetic head 10 has a sliding surface 10a opposed to the magnetic recording medium in arc shape in parallel with the sliding direction of the magnetic recording medium shown by the arrow A in FIG. 10 to adjust the manner in which the magnetic head 10 abuts on the magnetic recording medium. The magnetic head 10 has contact width regulating grooves 18 formed therein for adjusting a contact area with the magnetic recording medium. The contact width regulating grooves 18 are formed on both sides of the magnetic head 10 in parallel with the direction shown by the arrow A in FIG. 10.

In the magnetic head 10, the non-magnetic substrate 12 is made of a $CaO$—$TiO_2$—$NiO$ based non-magnetic material. The non-magnetic substrate 12, however, is not limited thereto, and may be made of calcium titanate, barium titanate, zirconium oxide, alumina, alumina titanium carbide, Zn ferrite, or the like, for example.

The non-magnetic substrate 12 has, on its surface, an underlying film 30 made of chromium deposited at a thickness of approximately 10 nm on which a glass thin film 31 is predeposited. The surface of the non-magnetic substrate 12 is remarkably planarized by performing heat treatment until the predeposited glass thin film 31 is softened to a predetermined viscosity and then performing curing until the glass thin film 31 is hardened. In other words, thermal shrinkage at the hardening of the softened glass thin film 31 stretches the surface of the glass thin film 31 to mirror-finish the surface of the non-magnetic substrate 12 including the slope 12a.

The glass thin film 31 is formed of borosilicate glass having a softening point of approximately 700° C. at a thickness of approximately 500 nm. The glass thin film 31 is not limited to such borosilicate glass, and any other glass materials may be used, for example, a low-melting glass having a low softening point.

In the magnetic head 10, a soft magnetic material such as Sendust (an Fe—Al—Si alloy) is deposited as the metal magnetic thin film 13. The metal magnetic thin film 13 is deposited on the mirror-finished surface of the non-magnetic substrate 12 on which the slope 12a at a predetermined angle is formed. Since the metal magnetic thin film 13 is deposited on the mirror-finished surface of the non-magnetic substrate 12 in this manner, soft magnetic properties can be improved.

The metal magnetic thin film 13 has a recess 13a in a generally central portion on an end face of the magnetic core half 11 bonded to the counterpart. Thus, the metal magnetic thin film 13 has a front abutting surface 19 and a back abutting surface 20 separated and exposed by the low-melting glass 14 filled into the recess 13a on a bonding surface 11a of the magnetic core half 11. The front abutting surfaces 19 of the paired magnetic core halves 11 are caused to confront each other through the non-magnetic thin film 16 to form a front gap 21. The back abutting surfaces 20 of the paired magnetic core halves 11 are caused to confront each other through the non-magnetic thin film 16 to form a back gap 22.

The magnetic core half 11 has on the bonding surface 11a a coil formation recess 23 in which the thin film coil 15 centered on the back abutting surface 20 is deposited. A coil connection terminal 24 is formed near the back abutting surface 20 in the coil formation recess 23. The thin film coil 15 is deposited in the coil formation recess 23 and has an end in the center connected to the coil connection terminal 24.

Each coil connection terminal 24 is formed at a height adjusted to be flush with each bonding surface 11a of the paired magnetic core halves 11. In the magnetic head 10, when the pair of magnetic core halves 11 are bonded to each other, a pair of the coil connecting terminals 24 are also bonded to each other. Thus, when the pair of magnetic core halves 11 are bonded to each other in the magnetic head 10, a pair of the thin film coils 15 are electrically connected to each other.

An end of the thin film coil 15 on the outer periphery is drawn opposite to the sliding surface 10a for the magnetic recording medium. The paired magnetic core halves 11 have external connection terminals 25, respectively, at positions to which the thin film coils 15 are drawn. The ends of the thin film coils 15 on the outer periphery are connected to the external connection terminals 25, respectively.

Each external connection terminal 25 is exposed to a side of the magnetic head 10 to have a function of electrically connecting the thin film coil 15 to the outside. The paired externally connecting terminals 25 are formed at positions where they are not in contact with each other to avoid short-circuit when the paired magnetic core halves 11 are bonded to each other.

In the magnetic head 10 structured as described above, the glass thin film 31 is deposited on the surface of the non-magnetic substrate 12 over which the metal magnetic thin film 13 is deposited, and the thermal shrinkage at the softening and the subsequent hardening of the glass thin film 31 stretches the surface of the glass thin film 31 to remarkably planarize the surface of the non-magnetic substrate 12. Consequently, favorable soft magnetic properties can be obtained in the metal magnetic thin film deposited on the non-magnetic substrate 12 having the remarkably planarized surface to improve the characteristics of the magnetic head 10.

While the present embodiment employs the glass thin film 31 with a thickness of approximately 500 nm, the surface of the non-magnetic substrate 12 can be planarized as long as the glass thin film 31 is deposited on the surface over which the metal magnetic thin film 13 is deposited. However, as the glass thin film 31 has a larger thickness, it takes excessive time to deposit the glass thin film 31 on the non-magnetic substrate 12. For this reason, the glass thin film 31 preferably has a thickness of 1000 nm or smaller.

Next, a method of manufacturing the aforementioned magnetic head 10 will be described in detail with reference particularly to FIGS. 11 to 21.

To produce the magnetic head 10, a plurality of magnetic core halves 11 are first produced in lines on the same substrate. Next, the substrate is cut into pieces for each line in which each of the plurality of magnetic core halves 11 is formed to obtain blocks of the magnetic core halves 11. Then, a pair of blocks of the magnetic core halves 11 are integrally bonded to each other through metal diffusion bonding to form a block of magnetic heads 10. The block of the magnetic heads 10 is cut into individual magnetic heads 10 to complete magnetic heads 10. These steps will hereinafter be described in order.

Figure 11:
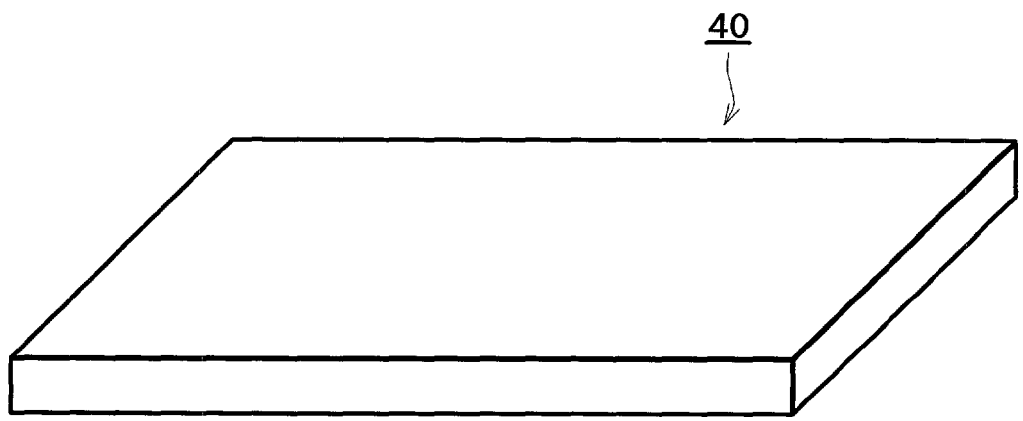
FIG. 11 is a perspective view showing a substrate, for explaining a method of manufacturing the magnetic head.

First, as shown in FIG. 11, a substrate 40 in substantially flat plate shape is prepared. The substrate 40, which is to serve as the non-magnetic substrate 12 of the magnetic head 10, is made of a $CaO$—$TiO_2$—$NiO$ based non-magnetic material, for example. The substrate 40 has a thickness of approximately 2 mm, a length and a width of approximately 30 mm, by way of example.

Figure 12:
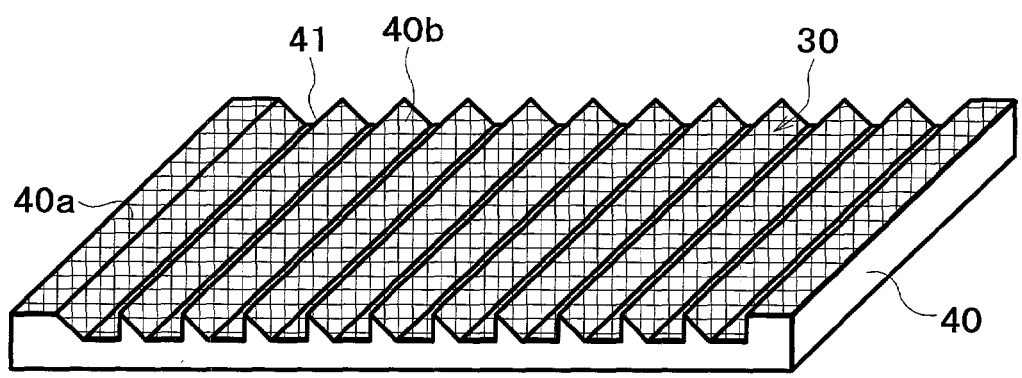
FIG. 12 is a perspective view showing the substrate with magnetic core forming grooves formed thereon, for explaining the method of manufacturing the magnetic head.

Next, as shown in FIG. 12, a plurality of magnetic core forming grooves 41 are formed in parallel with one another to have an angle of, for example 45 degrees, with a grindstone or the like in a main surface 40a of the aforementioned substrate 40. The resulting substrate 40 has a plurality of slopes 40b formed thereon by the magnetic core forming grooves 41 formed in this first grooving. The slopes 40b formed at this point may have an arc shape or a polygonal shape. While the slopes 40b preferably have an inclination angle of approximately 25 to 60 degrees with respect to the main surface 40a of the substrate 40, more preferably, it has an inclination angle of approximately 35 to 50 degrees in consideration of prevention of a pseudogap or accuracy of a track width. In the present embodiment, the magnetic core forming grooves 41 have a depth of approximately 130 μm and a width of approximately 150 μm.

Next, an underlying film 30 made of chromium is deposited to have a thickness of approximately 10 nm on the entire surface of the substrate 40 having the slopes 40b formed thereon.

Figure 13:
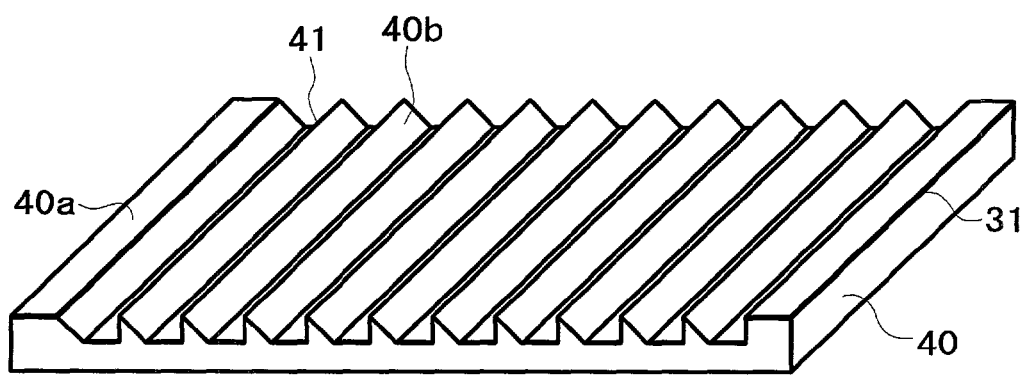
FIG. 13 is a perspective view showing the substrate with a glass thin film deposited thereover, for explaining the method of manufacturing the magnetic head.

Then, as shown in FIG. 13, a borosilicate glass thin film 31 having a softening point of approximately 700° C. is deposited at a thickness of approximately 500 nm, for example, through sputtering, over the entire surface of the substrate 40 having the underlying film 30 deposited thereon. The substrate 40 having the glass thin film 31 deposited thereon is then subjected to heat treatment at 800° C. for one minute to soften the glass thin film 31. The softened glass thin film 31 is naturally cooled until it is hardened.

Thus, thermal shrinkage at the hardening of the softened glass thin film 31 stretches the surface of the glass thin film 31, so that the entire surface of the substrate 40 having the slopes 40b formed thereon is remarkably planarized including the inner surfaces of the magnetic core forming grooves 41.

Figure 14:
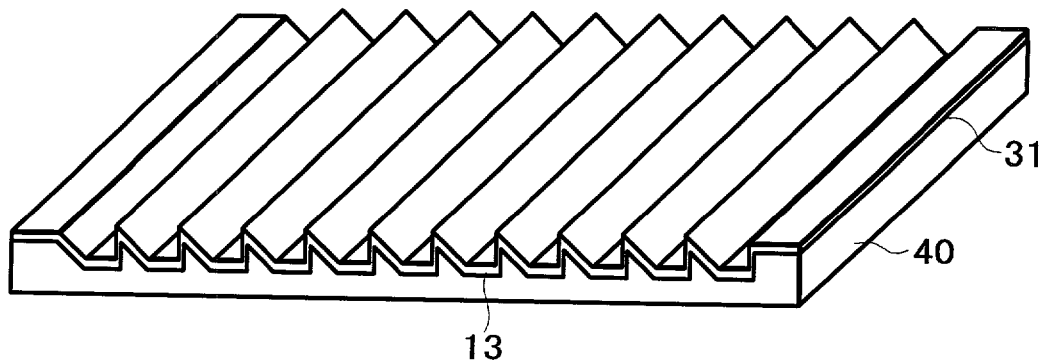
FIG. 14 is a perspective view showing the substrate with a metal magnetic thin film deposited thereover, for explaining the method of manufacturing the magnetic head.

Next, as shown in FIG. 14, a metal magnetic thin film 13 is deposited on the entire surface of the substrate 40 remarkably planarized including the inner surfaces of the magnetic core forming grooves 41. Since the metal magnetic thin film 13 is deposited on the remarkably planarized substrate 40, soft magnetic properties thereof can be significantly improved.

In the deposition step, the metal magnetic thin film 13 is deposited such that three layers of metal magnetic materials are laminated with non-magnetic layers interposed between them. The metal magnetic thin film 13 is deposited, for example, through a magnetron sputtering process, an MBE (Molecular Beam Epitaxy) process, or a vapor deposition process such as a PVD (Physical Vapor Deposition) process and a CVD (Chemical Vapor Deposition) process.

The metal magnetic thin film 13 is not necessarily limited to one including a plurality of metal magnetic layers, and may be formed of a single metal magnetic layer. The metal magnetic thin film 13, however, preferably has a laminated structure including a plurality of separated metal magnetic layers to obtain high sensitivity in a higher frequency range. The metal magnetic thin film 13 thus structured can achieve high sensitivity in a higher frequency range due to a reduced eddy current loss.

Figure 15:
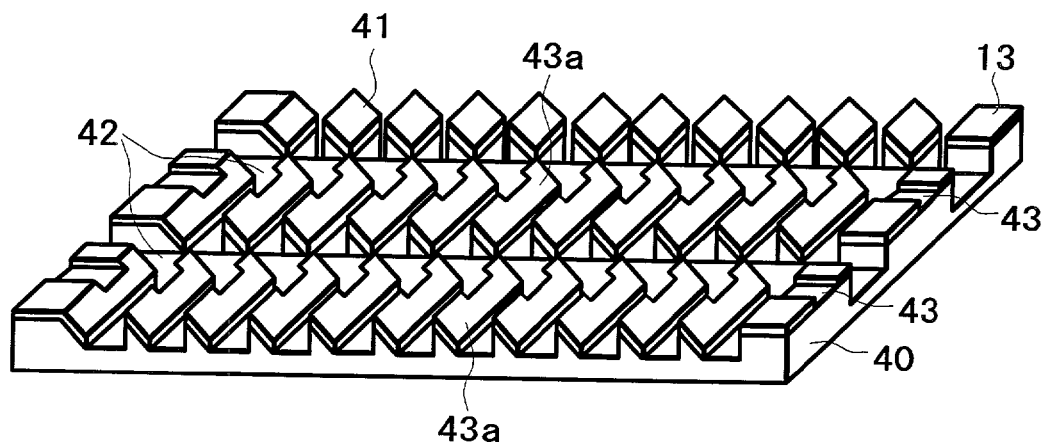
FIG. 15 is a perspective view showing the substrate with separating grooves and winding grooves formed thereon, for explaining the method of manufacturing the magnetic head.

In the present embodiment, the metal magnetic thin film 13 is formed of alternately laminated layers of an Fe—Al—Si alloy (Sendust) of 4 μm and alumina of 0.15 μm which is to serve as a non-magnetic layer (not shown) such that the metal magnetic thin film 13 has three Fe—Al—Si alloy layers. When the metal magnetic thin film 13 is formed of a plurality of layers, a single material or a mixture of materials such as alumina, $SiO_2$ or SiO is used for the non-magnetic layer. The thickness of the non-magnetic layer is set to provide enough insulation between adjacent metal magnetic layers. Next, as shown in FIG. 15, second grooving is performed in a direction substantially perpendicular to the magnetic core forming grooves 41 on the surface on which the metal magnetic thin film 13 is formed. In the second grooving, separating grooves 42 are formed for separating the magnetic cores 17 in a predetermined size, and winding grooves 43 are formed for depositing thin film coils 15 in the respective magnetic cores 17 separated along the separating grooves 42.

At this point, the metal magnetic thin film 13 formed in portions other than the slopes 40b, that is, the metal magnetic thin film 13 formed on the bottom of the magnetic core forming grooves 41 is removed through grinding.

The separating grooves 42 are provided for magnetically separating the magnetic cores 17 in the front-to-back direction on the substrate 40 to form the individual magnetic cores 17 such that a closed magnetic circuit is formed in each magnetic core 17. While two separating grooves 42 are shown in the example of FIG. 15, it is necessary to provide the separating grooves 42 corresponding to the number of the lines of magnetic core halves 11 to be formed. In addition, the separating grooves 42 must be formed to have a depth to completely cut the metal magnetic thin film 13 in order to magnetically separate the respective magnetic cores 17 arranged in lines in the front-to-back direction. Specifically, the separating grooves 42 have a depth of 150 μm from the bottom of the magnetic core forming grooves 41, that is, a depth of 280 μm from the main surface 40a of the substrate 40.

On the other hand, in the aforementioned magnetic head 10, each of the winding grooves 43 forms a recess 13a in the metal magnetic thin film 13 in the magnetic core 17. Thus, the winding grooves 43 must be formed to have a depth not to cut the metal magnetic thin film 13 in order to form the magnetic core 17 having the front abutting surface 19 and the back abutting surface 20 and to form the coil formation recess 23. Because of this, the cut surface of the metal magnetic thin film 13 is exposed on the surfaces of the winding grooves 43.

The winding grooves 43 have a shape determined in accordance with the lengths of the front abutting surface 19 and the back abutting surface 20. In the present embodiment, the winding grooves 43 are formed to have a width of 140 μm such that the front abutting surface 19 has a length of 30 μm and the back abutting surface 20 has a length of 85 μm. The winding grooves 43 may have a depth not to cut the metal magnetic thin film 13, but if it has too large a depth, the magnetic path becomes longer to reduce the efficiency of magnetic flux transfer. The depth of the winding grooves 43 depends on the thickness of the thin film coil 15 deposited in a step, later described, and in the present embodiment, the depth is set to 20 μm.

The winding grooves 43 are not limited in shape, but in the present embodiment, the winding grooves 43 have slopes 43a at an angle of 45 degrees on sides closer to the front abutting surface 19. Thus, the magnetic core 17 is structured to concentrate magnetic flux on the sliding surface 10a, so that the sensitivity of the magnetic head 10 can be improved.

Figure 16:
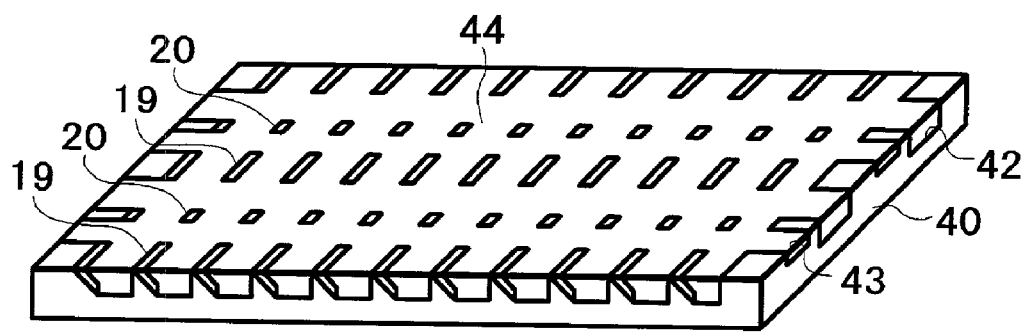
FIG. 16 is a perspective view showing the substrate with low-melting glass applied thereon, for explaining the method of manufacturing the magnetic head.

Next, as shown in FIG. 16, a molten low-melting glass 44 is applied onto the main surface 40a of the substrate 40 on which the magnetic core forming grooves 41, the separating grooves 42 and the winding grooves 43 are formed. Then, the low-melting glass 44 is cooled and set, and planarizing is performed on the surface of the set low-melting glass 44.

When the planarizing is performed on the low-melting glass 44, an exposed portion of the substrate 40 desirably has a width smaller than the width of the innermost track of the thin film coil 15. This can prevent occurrence of a step due to a difference in etching rate between the substrate 40 and the low-melting glass 44 when etching is performed in a later processing step.

Figure 17:
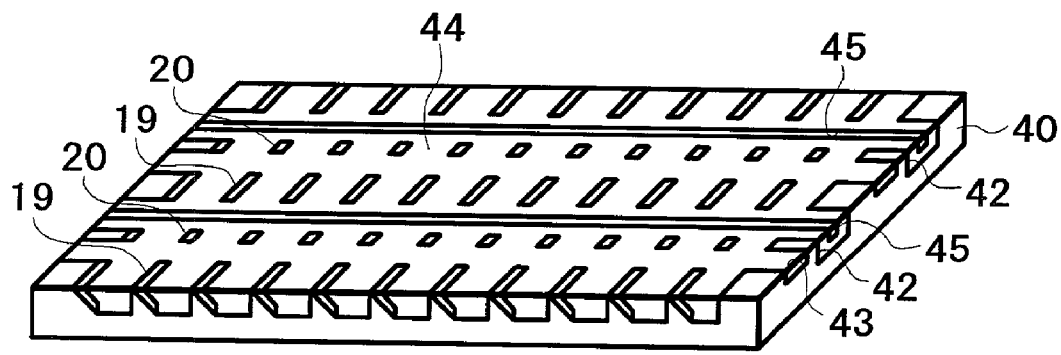
FIG. 17 is a perspective view showing the substrate with terminal grooves formed thereon, for explaining the method of manufacturing the magnetic head.

Next, as shown in FIG. 17, grinding is performed with a grindstone or the like on the solidified low-meting glass 44 to form terminal grooves 45. The terminal grooves 45 are formed to be positioned immediately above the aforementioned separating grooves 42. In the present embodiment, the terminal grooves 45 have a width and a depth of 100 μm. Then, a conductor such as Cu is filled into the terminal grooves 45 through plating or the like. Thereafter, planarizing is again performed on the surface of the low-melting glass 44. The conductor such as Cu filled into the terminal grooves 45 is to serve as the external connection terminals 25 in the aforementioned magnetic head 10.

Figure 18:
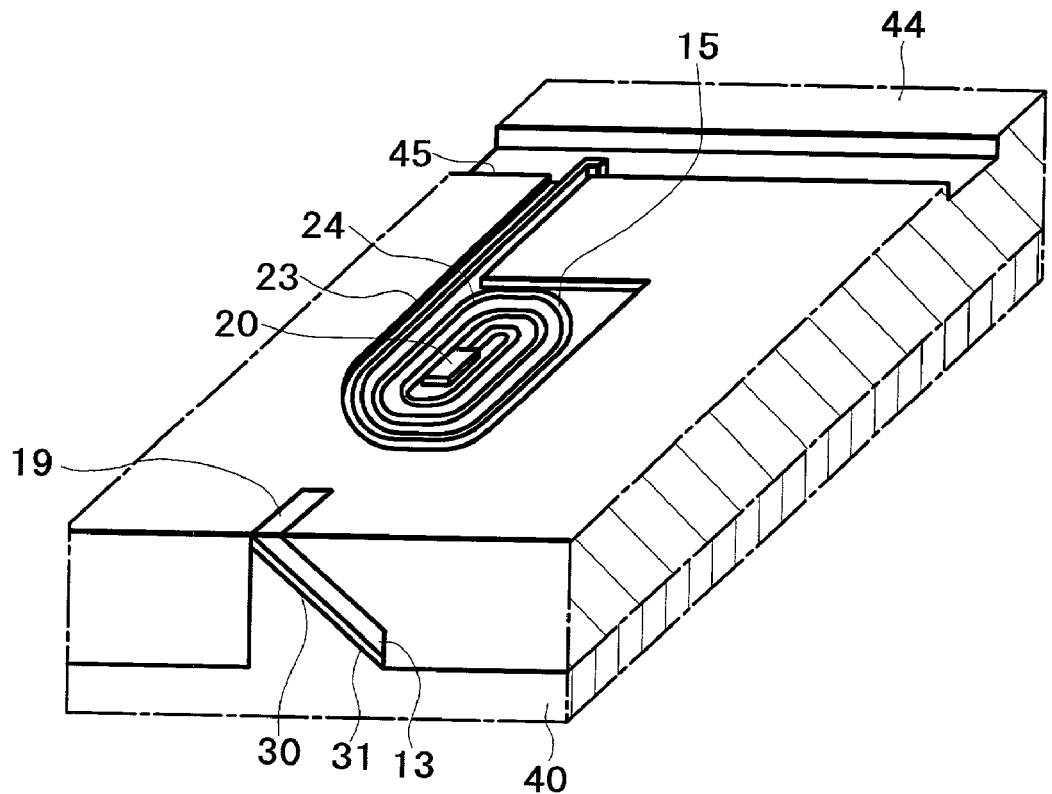
FIG. 18 is an enlarged perspective view showing a main portion of the substrate with a thin film coil deposited thereon, for explaining the method of manufacturing the magnetic head.

Next, as shown in FIG. 18, the low-melting glass 44 is subjected to etching to form the coil formation recess 23, on which the thin film coil 15 is deposited.

The coil formation recess 23 has a substantially rectangular shape substantially centered on the back abutting surface 20, and is formed by etching a portion excluding the back abutting surface 20 and the coil connecting terminal 24. The coil formation recess 23 has a groove 23a to reach the terminal groove 45 from one end thereof.

Figure 19:
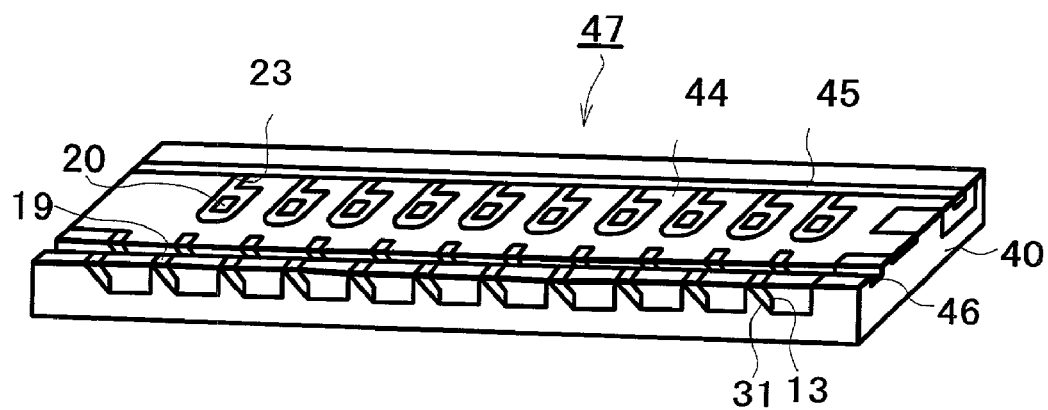
FIG. 19 is a perspective view showing a magnetic core half block obtained by cutting and dividing the substrate, for explaining the method of manufacturing the magnetic head.

Next, as shown in FIG. 19, side grooves 46 in angular shape are formed across the front abutting surfaces 19 extending in parallel on the main surface of the substrate 40. Then, the substrate 40 having the magnetic core halves 11 formed in parallel and in lines is cut into pieces for each line to form magnetic core half blocks 47.

The side groove 46 is formed through grinding to have a depth of 50 μm and a width of 400 μm, by way of example. When the side groove 46 is formed, part of the front abutting surface 19 is exposed on the side of the side groove 46. The side groove 46 is formed to expose the top end of the front abutting surface 19 as an indicator for positioning when a pair of magnetic core half blocks 47 are abutted on each other, which will be later described.

After the side groove 46 is formed, the main surface of the substrate 40 is subjected to mirror polishing for planarizing. At this point, the front abutting surface 19 and the back abutting surface 20 covered with a protecting film are exposed to the outside.

Figure 20:
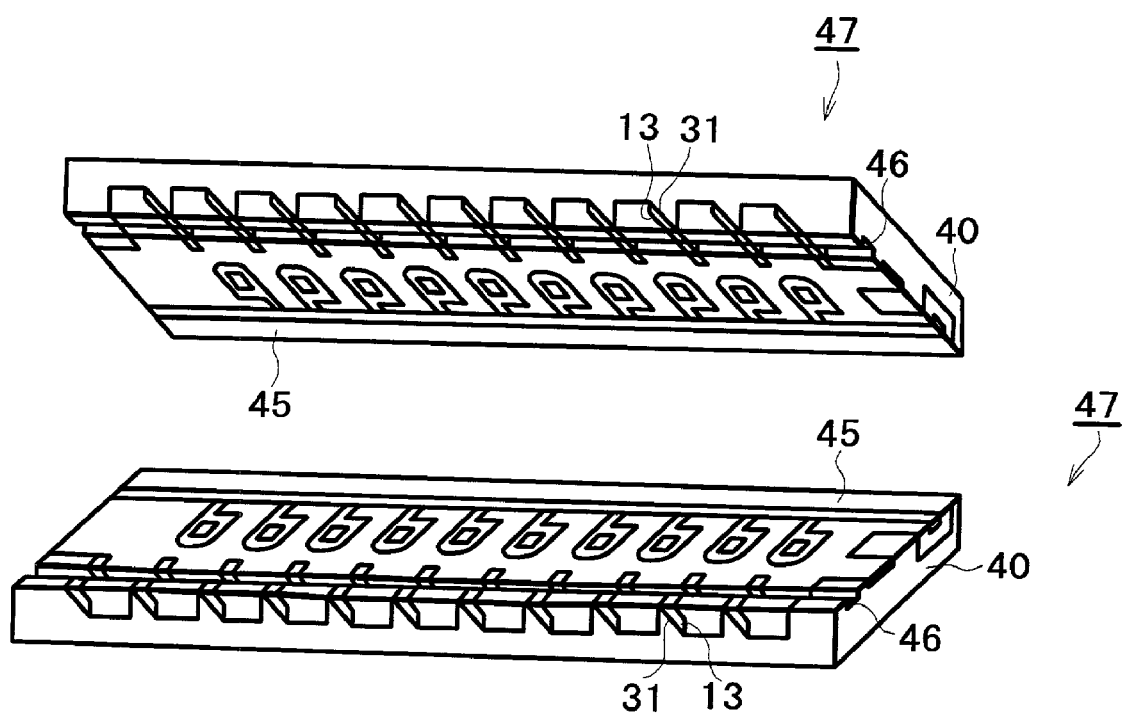
FIG. 20 is a perspective view showing a pair of magnetic core half blocks during their bonding to each other, for explaining the method of manufacturing the magnetic head.

Next, as shown in FIG. 20, a pair of the magnetic core half blocks 47 are accurately positioned and metal diffusion bonding is performed. At this point, the pair of magnetic core half blocks 47 are accurately positioned by patterning a junction between them with Au which is to serve as the non-magnetic thin film 16, and placing face-to-face the top ends of their front abutting surfaces 19 adjacent to the side grooves 46. Then, the paired magnetic core half blocks 47 confronted each other are heated at a predetermined temperature and applied with a predetermined pressure to have the metal diffusion bonding, thereby producing a magnetic head block 48. While the metal diffusion bonding is performed with the Au patterning in the present embodiment, the pair of magnetic core half blocks 47 may be bonded to each other using an adhesive, water glass or the like, for example.

Figure 21:
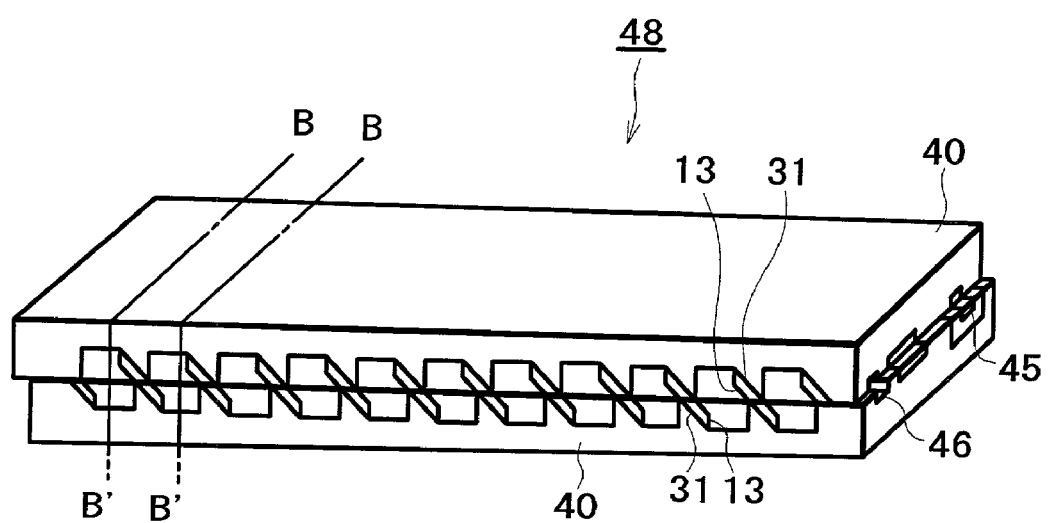
FIG. 21 is a perspective view showing a magnetic head block, for explaining the method of manufacturing the magnetic head.

Next, as shown in FIG. 21, the magnetic head block 48 is cut and divided into individual magnetic heads 10. At this point, the magnetic head block 48 is divided into individual magnetic heads 10 by cutting along lines B–B' in FIG. 21 such that an azimuth angle is 20 degrees. In this manner, the magnetic head 10 is completed.

As described above, in the method of manufacturing a magnetic head to which the present invention is applied, the thermal shrinkage at the hardening of the softened glass thin film 31 stretches the surface of the glass thin film 31 to remarkably planarize the surface of the substrate 40 including the inner surfaces of the magnetic core forming grooves 41 formed in the surface of the substrate 40, so that the soft magnetic properties can be improved in the metal magnetic thin film 13 deposited over the substrate 40 having the remarkably planarized surface. The pair of the magnetic core half blocks 47 are formed and bonded to each other through the non-magnetic thin film 16 such that the front abutting surfaces 19 and the back abutting surfaces 20 of the metal magnetic thin films 13 of the paired magnetic core half blocks 47 confront each other to produce a magnetic core block 48 which is then cut into individual magnetic heads 10. It is thus possible to manufacture the magnetic heads 10 in volume with improved characteristics.

Recording/reproduction output and optimal recording current of the magnetic head 10 produced using the substrate 40 having the remarkably planarized surface through the aforementioned substrate planarizing method and of a magnetic head using a substrate on which planarizing was not performed were measured. Table 1 shows the results obtained in the measurements. The evaluation criteria for these magnetic heads conform to a DVC (Digital Video Cassette) format.

TABLE 1

| planarizing of substrate | reproduction output ($\mu$V, 10 MHz) | optimal recording current (mApp) |
| --- | --- | --- |
| performed | 945 | 21.9 |
| not performed | 598 | 35.8 |

It can be seen from the measurement results in Table 1 that the magnetic head 10 using the substrate 40 having the remarkably planarized surface has a higher recording/reproduction output of the magnetic head and a lower optimal recording current of the magnetic head as compared with the magnetic head having the substrate on which planarizing was not performed.

In this manner, since the magnetic head 10 has the metal magnetic thin film 13 deposited over the substrate 40 having the remarkably planarized surface to improve soft magnetic properties of the metal magnetic thin film 13, the recording/reproduction output is increased and the increased recording/reproduction output can be obtained with a lower recording current.

While the magnetic head 10 is taken as an example of the device using the substrate 40 having the remarkably planarized surface with the aforementioned substrate planarizing method, the device using the substrate 40 having the remarkably planarized surface is not necessarily limited to the magnetic head 10. When the substrate 40 is used for other devices produced on a remarkably planarized substrate with the thin film technology, for example a semiconductor device, a thin film head such as an MR head or an MIG head, the characteristics of such devices can also be improved similarly to the aforementioned case.

What is claimed is:
1. A magnetic head comprising,
a pair of magnetic core halves;
each of said halves including a non-magnetic substrate and a metal magnetic thin film deposited over a surface of said non-magnetic substrate;

said pair of halves being bonded integrally to each other with the one metal magnetic thin film abutting on the other and with a magnetic gap formed between the abutting surfaces;

the respective surfaces of said non-magnetic substrates over which said metal magnetic thin films are deposited being in nonparallel with said magnetic gap; and an underlying film made of chromium or chromium oxide deposited between said non-magnetic substrate and said glass thin film, wherein said non-magnetic substrate has a glass thin film deposited on the surface thereof over which said metal magnetic film is deposited.

2. A magnetic head comprising, a pair of magnetic core halves, each of said halves including a non-magnetic substrate and a metal magnetic thin film deposited over a surface of said non-magnetic substrate, said pair of halves being bonded integrally to each other with the one metal magnetic thin film abutting on the other and with a magnetic gap formed between the abutting surfaces, the respective surfaces of said non-magnetic substrates over which said metal magnetic thin films are deposited being in nonparallel with said magnetic gap, and an underlying film made of chromium or chromium oxide deposited between said non-magnetic substrate and said glass thin film, wherein said non-magnetic substrate has a glass thin film deposited on the surface thereof over which said metal magnetic film is deposited, and wherein said glass thin films is stretched by thermal shrinkage to planarize the surface of said non-magnetic substrate over which said metal magnetic thin film is deposited.

3. The magnetic head according to claim 2, wherein said glass thin film is softened at a viscosity in a range from $10^3$ Pa·s to $10^{6.76}$ Pa·s.

4. The magnetic head according to claim 2, wherein said glass thin film is softened at a viscosity in a range from $10^{4.4}$ Pa·s to $10^{6.76}$ Pa·s.

5. The magnetic head according to claim 2, wherein said glass thin film has a thickness of 1000 nm or less.

6. The magnetic head according to claim 2, wherein said underlying film has a thickness of 20 nm or less.

* * * * *